(12) United States Patent
Kibblewhite

(10) Patent No.: US 10,088,378 B2
(45) Date of Patent: Oct. 2, 2018

(54) SYSTEM FOR APPLYING AN ULTRASONIC TRANSDUCER TO A FASTENER

(71) Applicant: Innovation Plus, LLC, King of Prussia, PA (US)

(72) Inventor: Ian E. Kibblewhite, Wayne, PA (US)

(73) Assignee: Innovation Plus, LLC, King of Prussia, PA (US)

(*) Notice: Subject to any disclaimer, the term of this patent is extended or adjusted under 35 U.S.C. 154(b) by 0 days.

(21) Appl. No.: 15/124,535

(22) PCT Filed: Mar. 11, 2015

(86) PCT No.: PCT/US2015/019883
§ 371 (c)(1),
(2) Date: Sep. 8, 2016

(87) PCT Pub. No.: WO2015/138562
PCT Pub. Date: Sep. 17, 2015

(65) Prior Publication Data
US 2017/0023425 A1    Jan. 26, 2017

Related U.S. Application Data

(60) Provisional application No. 61/951,376, filed on Mar. 11, 2014.

(51) Int. Cl.
*G01L 5/24* (2006.01)
*F16B 11/00* (2006.01)
*F16B 31/02* (2006.01)

(52) U.S. Cl.
CPC .......... *G01L 5/246* (2013.01); *F16B 11/006* (2013.01); *F16B 2031/022* (2013.01)

(58) Field of Classification Search
CPC ... G01L 5/246; G01L 5/24; G01L 1/25; G01L 5/346; B06B 1/06; F16B 31/02; G16B 31/02; G16B 11/006; G16B 2031/022
(Continued)

(56) References Cited

U.S. PATENT DOCUMENTS 3,776,031 A * 12/1973 Trigg .................. G01L 5/24
                                                     116/225
4,294,122 A    10/1981 Couchman
(Continued)

FOREIGN PATENT DOCUMENTS

WO        02061292 A1    8/2002

OTHER PUBLICATIONS

Int'l Preliminary Report on Patentability dated Sep. 13, 201616 in Int'l Application No. PCT/US2015/019883.
(Continued)

*Primary Examiner* — Jonathan Dunlap
*Assistant Examiner* — Octavia Hollington
(74) *Attorney, Agent, or Firm* — Panitch Schwarze Belisario & Nadel LLP

(57) ABSTRACT

Low cost transducer bonding tooling and techniques are provided which can be used to duplicate the quality of factory manufactured load indicating members, and to allow transducers to be attached to fasteners irrespective of their orientation. The bonding tooling and techniques can also be used to bond other small objects requiring precise placement and reliable bonding such as, for example, the bonding of identification labels to manufactured components or structures.

16 Claims, 4 Drawing Sheets

(58) Field of Classification Search
USPC .................................................. 73/761, 760
See application file for complete search history.

(56) References Cited

U.S. PATENT DOCUMENTS

| | | | |
|---|---|---|---|
| 4,686,859 A * | 8/1987 | Wallace | ................. B25B 23/14 411/14 |
| 4,846,001 A | 7/1989 | Kibblewhite | |
| 5,131,276 A | 7/1992 | Kibblewhite | |
| 5,721,380 A | 2/1998 | Gozlan | |
| 6,501,211 B1 * | 12/2002 | Nasrollahzadeh | .... H01L 41/042 310/317 |
| 6,990,866 B2 | 1/2006 | Kibblewhite | |
| 7,260,997 B2 * | 8/2007 | Luethje | .................... G01L 5/24 73/761 |
| 8,028,585 B2 | 10/2011 | Kibblewhite | |
| 2003/0011275 A1 | 1/2003 | Nasrollahzadeh | |
| 2003/0161984 A1 | 8/2003 | Bries et al. | |
| 2005/0257614 A1 | 11/2005 | Schirmer et al. | |
| 2010/0126279 A1 | 5/2010 | Kibblewhite | |

OTHER PUBLICATIONS

MC900 Transient Recorder Manual 1.0.
Extended European Search Report dated Sep. 29, 2017 in EP Application No. 15762206.9.

* cited by examiner

SYSTEM FOR APPLYING AN ULTRASONIC TRANSDUCER TO A FASTENER

CROSS-REFERENCE TO RELATED APPLICATIONS

The present application is a Section 371 national phase application claiming the benefit of International Patent Application No. PCT/US15/19883 filed Mar. 11, 2015 and claims the benefit of U.S. Provisional Patent Application No. 61/951,376 filed Mar. 11, 2014, both titled, "System for Applying an Ultrasonic Transducer to a Fastener."

BACKGROUND OF THE INVENTION

This invention relates to the bonding of a small object, such as a transducer or an identification label, precisely and reliably to a component for the purpose of measurement or identification, and more specifically, to the bonding of an ultrasonic transducer to a fastener to produce a load indicating fastener using a process which is both easy and reliable for a technician in a test lab or at an assembly or construction site.

For some time, ultrasonics has been used to accurately measure the load in bolts. Initially, removable ultrasonic devices were the most commonly used. More recently, low-cost permanent ultrasonic transducers, which can be permanently attached to one end of the fastener, have come to be used. Permanent fasteners of this type are described, for example, in U.S. Pat. No. 4,846,001 (Kibblewhite), issued Jul. 11, 1989; U.S. Pat. No. 5,131,276 (Kibblewhite), issued Jul. 21, 1992; U.S. Pat. No. 6,990,866 (Kibblewhite), issued Jan. 31, 2006; and U.S. Pat. No. 8,028,585 (Kibblewhite) issued Oct. 4, 2011, the subject matter of each of which is incorporated by reference as if fully set forth herein.

Load measurements in fasteners using ultrasonics use a pulse-echo technique to determine the time-of-flight or acoustic length of the fastener. With permanently attached transducers that are bonded to an end of a fastener with an adhesive, such measurements are very dependent on the position of the transducer and the characteristics of the bond. In addition to providing the mechanical attachment, the adhesive acts as an acoustic couplant and an electrical capacitive coupling to the bolt surface. In order for the ultrasonic transducer to transmit and receive the acoustic waves effectively, the adhesive layer or "bond line" must be thin and free of air bubbles. In order to measure load accurately, the transducer must be precisely centered relative to the bolt shank on the end surface to minimize the effect of variations in stress across the diameter of the shank. Since this thin, repeatable bond line is difficult to achieve, the most accurate permanent ultrasonic transducer load indicating fasteners, such as i-Bolt® fasteners manufactured by Load Control Technologies of King of Prussia, Pa., are bonded in a manufacturing facility with precision automated robotic equipment.

There is a need for producing load indicating fasteners quickly for urgent test and development programs and, consequently, ultrasonic load measurement equipment manufacturers provide ultrasonic transducers for bonding to fasteners by the user to make load indicating fasteners.

An example of such an ultrasonic transducer and attachment procedure is described in the operating manual for the MC900 Transient Recorder manufactured by MicroControl, Inc. of Troy, Mich., the subject matter of which is incorporated by reference as if fully set forth herein. However, these manual manufacturing processes lack an effective way to precisely position the transducer and the operation is difficult and time consuming. Furthermore, poor bond line repeatability can cause measurement unreliability and inaccuracies.

It therefore remains desirable to provide a system which allows a user to make load indicating fasteners easily and quickly while achieving the precise placement and bond integrity of factory produced load indicating fasteners, and to provide a practical technique for applying a transducer to an already installed fastener, or in other situations in which the fastener cannot be oriented with its bonding surface facing up.

BRIEF SUMMARY OF THE INVENTION

Ultrasonic transducer attachment kits currently available for end users to attach transducers to fasteners are supplied without tooling for positioning and bonding the ultrasonic transducer. Transducer placement by hand requires a skilled technician, is very slow and tedious and results in a load indicating member which lacks the reliability accuracy of load indicating members produced in a manufacturing facility.

In accordance with the present invention, low cost transducer bonding tooling and techniques are provided which can be used to duplicate the quality of factory manufactured load indicating members. The present invention further allows transducers to be attached to fasteners irrespective of their orientation. In addition, the bonding tooling and techniques of the present invention can be used to bond other small objects requiring precise placement and reliable bonding such as, for example, the bonding of identification labels to manufactured components or structures.

For further detail regarding preferred embodiments for implementing the improvements of the present invention, reference is made to the description which is provided below, together with the following illustrations.

DETAILED DESCRIPTION OF THE INVENTION

Figure 1:
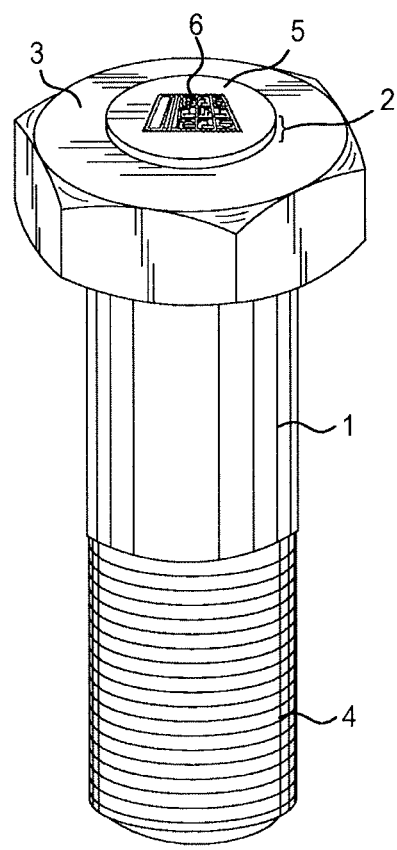
FIG. 1 shows an example of a typical load indicating fastener with an ultrasonic transducer permanently attached to the head.

FIG. 1 shows a typical load indicating fastener produced in accordance with the present invention. In this illustrative example, the load indicating fastener generally includes a fastener 1 and a permanent transducer 2 (e.g., of the type disclosed in the above-referenced U.S. Pat. No. 6,990,866, issued to Kibblewhite) attached to one end. The fastener 1 includes a head 3, which can be suitably engaged by an appropriate tool (not shown) for applying torque to the fastener 1, and a threaded or thread-forming body portion 4. As is disclosed in the above referenced U.S. Pat. No. 6,990,866, the transducer 2 can further include a bar code 6 applied to the top electrode 5 of the transducer 2, for purposes of facilitating the subsequent steps taken to obtain an indication of tensile load, stress, elongation or other characteristic of the fastener 1 during a tightening operation, or at various other times during the service life of the fastener 1.

Figure 3:
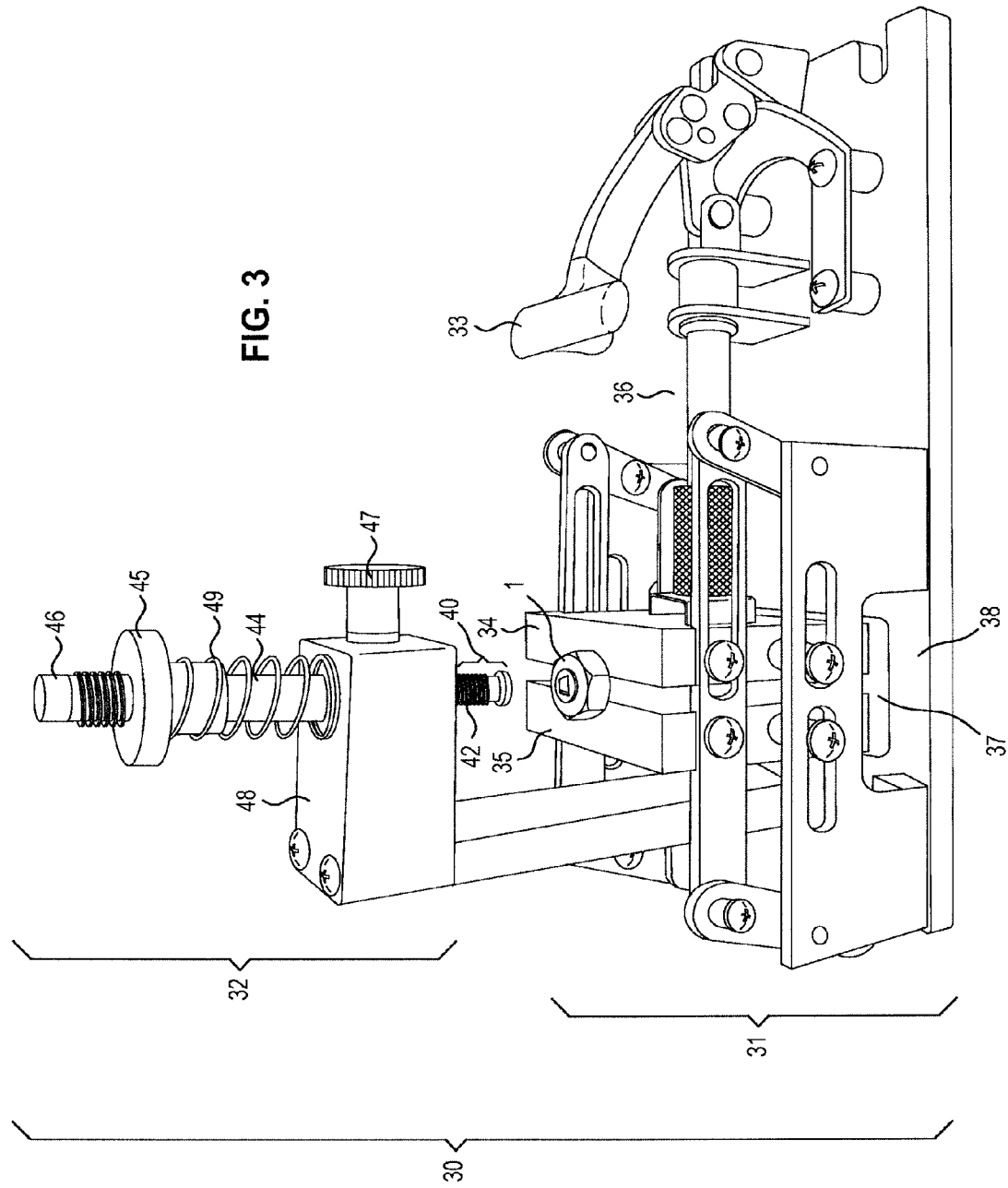
FIG. 3 shows a preferred embodiment of the tooling of the present invention, for use in attaching an ultrasonic transducer to an end of a fastener to form a load indicating member.

A load indicating member of the type shown in FIG. 1 can be produced with the tooling shown in FIG. 3 using transducer and transducer attachment materials in accordance with the present invention.

Figure 2:
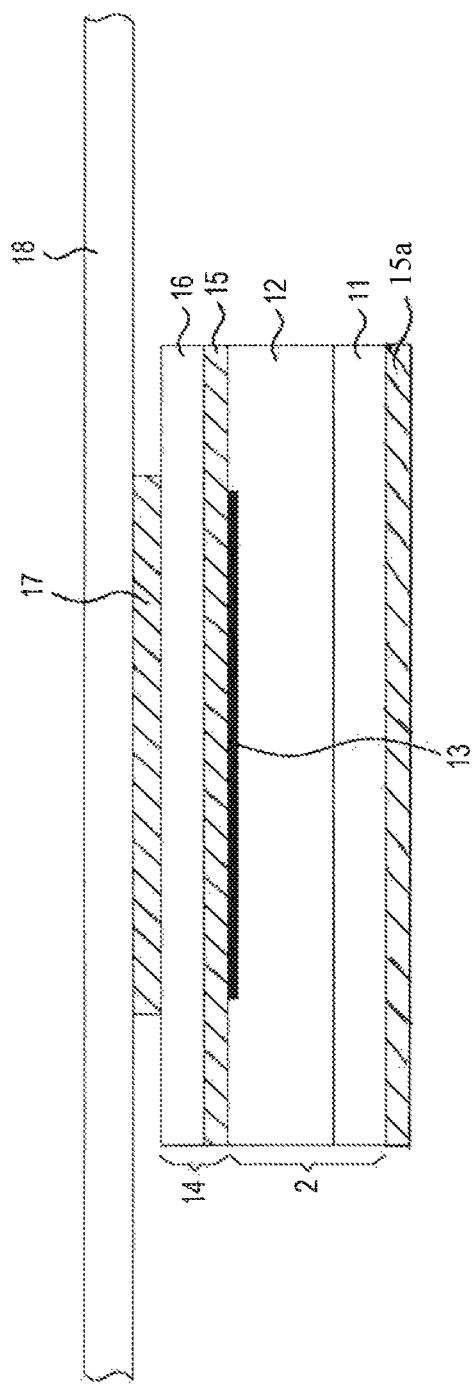
FIG. 2 shows a transducer with additional layers applied to facilitate precise bonding to a fastener to form a load indicating member.

In a preferred embodiment of the present invention, the transducer is supplied with additional layers temporarily attached to the top electrode, as illustrated in the cross-sectional view in FIG. 2, to facilitate bonding of the transducer to the bolt. FIG. 2 shows a transducer 2, which is preferably circular in shape, and which includes a laminate of polyvinylidene fluoride 11 and a metallic foil top electrode 12 with an etched bar code 13. Temporarily attached to top electrode 12 is an adhesive backed tape 14 including plastic film 16 and pressure adhesive layer 15, an example of which is commercially available Scotch® brand tape available from the 3M Company of St. Paul, Minn. The purpose of adhesive backed tape 14 is to protect the top surface of electrode 12 from adhesive during the bonding of the transducer. A low tack adhesive layer 17, of a type similar to the adhesives used for the commercially available Post-it® brand products also available from the 3M Company of St. Paul, Minn., is selectively applied to the top surface of adhesive backed tape 14, preferably using a mask with a hole diameter smaller than that of adhesive backed tape 14 to leave an area around the outer diameter of adhesive backed tape 14 top surface without adhesive. A first function of the low tack adhesive layer 17 is to temporarily attach transducer 10 with adhesive backed tape 14 to carrier strip 18 for delivery to the user. A second function of the low tack adhesive layer 17 is to precisely position the transducer during bonding of the transducer to the fastener with the transducer bonding tooling shown in FIG. 3.

The tooling 30 of FIG. 3 includes a transducer placement tooling 32 mounted above a self-centering vise 31 used to clamp fastener 1 during the transducer bonding operation. Self-centering vise 31 has two clamping "V" jaws 34 and 35, actuated during clamping such that each jaw moves equally in distance and opposite in direction, always locating the fastener axis in the same position irrespective of the diameter of the fastener 1. Rotation of adjustment nut 36 allows clamping of different sizes of fasteners, for example, from 6 mm diameter to 40 mm diameter, with over-center toggle lever 33. A hole 37 in bottom plate 38 below the center clamping axis of self-centering vise 31 enables clamping of very long fasteners, such as studs, when mounted with hole 37 over the edge of a work bench, for example.

Figure 4:
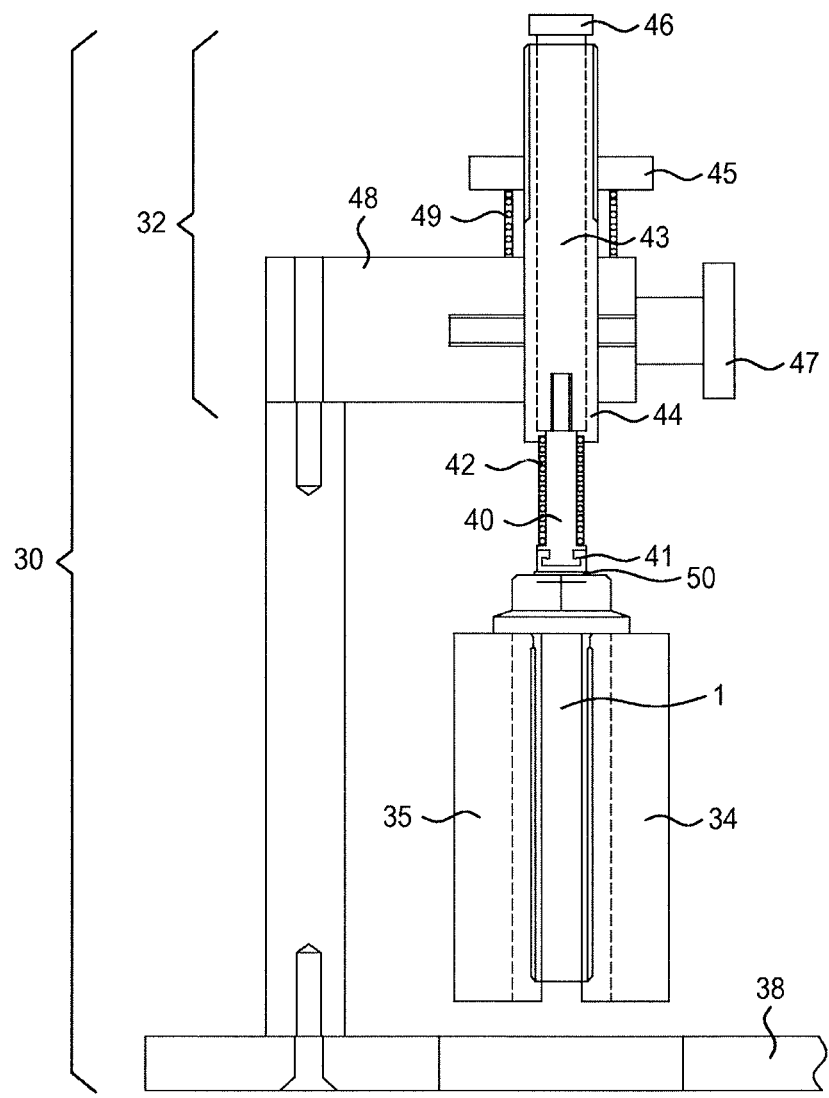
FIG. 4 is a cross-sectional view of part of the tooling of FIG. 3, with like numbers referring to corresponding elements.

The operation of tooling 30 is herein described with reference to FIG. 4, showing a cross-sectional view of part of tooling 30 of FIG. 3. Fastener 1, with its top end prepared for transducer bonding by providing a clean flat bonding surface, is clamped in jaws 34 and 35 of the self-centering vise so the axis of fastener 1 is aligned with the pressure pin 40. Pressure pin 40 is provided with pressure tip 41 and pressure controlling spring 42 and is screwed into pressure pin rod 43 which is free to move axially in alignment bar 44.

During operation, alignment bar 44, with pressure rod 43 and pressure pin 40 is lowered so that pressure pin tip 41 rests on the fastener 1 in the position as shown in FIG. 4. As alignment bar 44 is lowered further with pressure rod 43 and pressure pin 40 resting against fastener 1, pressure pin spring 42 is compressed with the amount of compression determining the force of pressure pin tip 41 against fastener 1. The axial distance in lowering alignment bar 44 is limited by adjustment thumb nut 45 and, since the distance of alignment bar 44 from fastener 1 determines the amount of compression of pressure pin spring 42, thumb nut 45 can be used to control the force exerted by pressure tip 41 on fastener 1. The protrusion of the top end 46 of pressure rod 43 from the alignment bar 44 provides an indication of the amount of compression of pressure pin spring 42 and, consequently, an indication of the force applied by pressure tip 41 on fastener 1. Thumb screw 47 is used to lock alignment bar 44 in its support block 48 in any required position. Alignment bar spring 49 returns alignment bar 44 to its up position when alignment bar 44 is released with thumb screw 47.

Pressure pin tip 41 is made of a soft elastic material, such as rubber or polyurethane, to provide even pressure on the transducer and eliminate any minor alignment variations during adhesive curing. Preferably, a thin adhesive backed replaceable protective plastic cap 50 of slightly larger diameter than pressure tip 41 is adhered to the bottom surface to extend beyond the outer edge of pressure tip 41 to protect pressure tip 41 from excess adhesive during bonding. In the preferred embodiment, protective plastic cap 50 preferably takes the form of a boot drawn over pressure tip 41 and retained in position through an interference fit between pressure tip 41 and protective cap 50, and is preferably formed as a cylindrical part having a flat bottom and made of a thin Teflon® material commercially available from E. I. duPont de Nemours and Company Corporation of Wilmington, Del. As an alternative, protective cap 50 can be made from adhesive backed Teflon® brand tape, also commercially available from E. I. du Pont de Nemours and Company Corporation of Wilmington, Del.

An example of a method for attaching a transducer 2 supplied on a carrier strip 18, as illustrated in FIG. 2, to a fastener to make a load indicating member using the tooling illustrated in FIG. 4 is as follows. With alignment bar 44 in the up position, a fastener with one end surface prepared flat and clean for bonding is placed in the self-centering vise and clamped between jaws 34 and 35, with the bonding surface up. The transducer is removed from the carrier strip using tweezers or similar tool and placed centered on the end of fastener 1. If the fastener has been prepared with the bonding surface in a recess centered on the fastener axis, the transducer is positioned in the center of the recess. Alternatively, if the entire fastener end surface is flat, the transducer is centered by placing it on the bonding surface directly below pressure pin tip 41. The transducer can be positioned easily by moving it with the tweezers or other pointed tool by contacting the area of protective tape 14 top surface without adhesive.

Alignment bar 44 is lowered fully at which time the pressure pin 41 protective cap 50 is firmly in contact with the transducer positioned on the top of fastener 1. The alignment bar 44 is then raised with the transducer adhered to protective cap 50 by the low tack adhesive layer 17. A very small drop of transducer bonding adhesive 15a is placed in the center of the bonding surface using a fine adhesive dispensing needle. Alignment bar 44 is then fully lowered to the position preset with thumb nut 45 and alignment bar 44 is locked in its lowered position using thumb screw 47.

The above-described operation has placed the transducer back on fastener 1 in precisely the same position that it was originally placed and holds it securely with a preset pressure for a specified time sufficient to allow the transducer bonding adhesive 15*a* to cure. After the specified cure time has elapsed, alignment bar 44 is raised after releasing thumb screw 47 and fastener 1 is removed from the self-centering vise with its bonded transducer. Excess adhesive is then removed, for example, using Q-Tips® brand swabs commercially available from Chesebrough-Pond's Inc. of Wilmington, Del., protective tape layer 14 is removed from top electrode 12 using a plastic or wooden pointed tool, such as the handle end of a Q-Tips® brand swab, and the entire transducer is cleaned with a solvent, such as isopropyl alcohol, once again, by conveniently using Q-Tips® brand swabs. The load indicating fastener is then ready for use.

In the preferred embodiment of the present invention, a cyanoacrylate adhesive with a cure time of 20 to 60 seconds is used to bond the transducer to the fastener, enabling a high production rate. Alternative adhesives, such as anaerobic or epoxy adhesives can also be used if required to meet specific application environmental conditions.

In an alternative embodiment, carrier strip 18 is thin and flexible and transducer 2 remains on carrier strip 18 during bonding. After the drop of adhesive is applied to the bonding surface, the transducer on the carrier strip is positioned just above the bonding surface and then alignment bar 44 is lowered, pressing the transducer 2 on the bonding surface through carrier strip 18. This embodiment eliminates the need for pressure tip cap 50 since the carrier strip protects pressure pin tip 41 from the bonding adhesive. This embodiment is most suited for bonding to a flat top surface rather than a bonding surface in a recess.

In yet another embodiment of the present invention pressure cap 50 has a reusable low tack adhesive applied to its bottom surface and the transducer is provided without low tack adhesive 17 on the adhesive backed tape layer 14. In this embodiment the reusable low tack adhesive on the bottom surface of protective cap 50 temporarily attaches the transducer to the pressure pin in the above described bonding operation.

It will be appreciated by those skilled in the art that protective cap 50 is only provided to prevent excess adhesive from adhering to pressure pin tip 41. If pressure pin tip 41 is made of a material that does not adhere to the adhesive used for bonding, protective cap 50 is not required. The above described embodiments use ultrasonic transducers including a laminate of polyvinylidene fluoride and metallic foil. Alternative types of ultrasonic transducers known in the art and described in the above referenced patents and documents, such as piezoelectric ceramic elements and thin film transducers deposited on metal foil, can also be attached to fasteners to form load indicating members using the improvements of the present invention.

An alternative embodiment of the present invention can be used to apply or reapply transducers on already installed fasteners. This may be necessary in highly corrosive environments, very high temperature environments, for very large fasteners or if the transducer fails and has to be replaced while in service. In this embodiment, transducer placement tooling similar to that described in the preferred embodiment is alternatively mounted directly to the fastener or joint, but in such a way that pressure tip 41 is aligned with and able to move along the axis of the fastener.

It will be appreciated by one skilled in the art that the above described invention can be used to precisely and reliably bond other small objects, such as other transducers, identification labels and RFID tags, to fasteners and to parts other than fasteners, such as manufactured parts, machines, vehicles and structures on site.

It will also be understood that while the present invention has been described based on specific embodiments incorporating specified parts, the present invention further encompasses all enabled equivalents of the parts described, and that various changes in the details, materials and arrangement of parts which have been herein described and illustrated in order to explain the nature of this invention may be made by those skilled in the art within the principle and scope of the invention as expressed in the following claims.

What is claimed is:

1. A system for applying an ultrasonic transducer to a fastener to produce a load indicating member, the system comprising:
    the ultrasonic transducer comprises an electrode and a protective layer temporarily attached to top surface portions of the electrode to facilitate bonding of the ultrasonic transducer to the fastener, the protective layer being removed from the top surface portions prior to use of the load indicating member; and
    a transducer bonding adhesive bonded to lower surface portions of the ultrasonic transducer.

2. The system of claim 1 which further includes a bar code applied to the top surface of the transducer.

3. The system of claim 1 wherein the ultrasonic transducer is formed as a laminate of polyvinylidene fluoride and a metallic foil.

4. The system of claim 1 wherein additional layers are attached to the top surface portions of the electrode, the additional layers include a carrier strip and a low tack adhesive layer.

5. The system of claim 4 wherein the protective layer is comprised of a plastic film layer and a pressure adhesive layer, the additional layers positioned on top of the protective layer with the low tack adhesive layer applied to a top of the protective layer.

6. A tooling and ultrasonic transducer assembly for placing the ultrasonic transducer on a fastener to produce a load indicating member, the assembly comprising:
    a transducer placement tooling mounted above a self-centering vise for clamping the fastener in position during placement of the ultrasonic transducer on the fastener;
    a transducer bonding adhesive bonded to lower surface portions of the ultrasonic transducer; and
    a protective layer temporarily attached to top surface portions of the ultrasonic transducer, the protective layer being removed from the top surface portions prior to use of the load indicating member.

7. The assembly of claim 6 wherein the self-centering vise includes opposing clamping jaws for actuation during clamping, for locating an axis of the fastener in a selected position irrespective of the diameter of the fastener.

8. The assembly of claim 7 wherein the self-centering vise receives fasteners having different sizes, from 6 mm in diameter to 40 mm in diameter.

9. The assembly of claim 7 wherein the transducer placement tooling includes a pressure tip coupled with a pressure controlling spring, and wherein the pressure tip and the pressure controlling spring are coupled with a pressure pin rod which is free to move axially in an alignment bar.

10. The assembly of claim 9 wherein the pressure pin tip is made of a soft elastic material, such as rubber or polyurethane, to provide even pressure on the transducer and to eliminate minor alignment variations.

11. The assembly of claim 10 which further includes an adhesive backed replaceable protective plastic cap adhered to a bottom surface of the pressure pin tip to protect the pressure pin tip.

12. The assembly of claim 11 wherein the protective plastic cap has a low tack adhesive applied to a bottom surface, for temporarily attaching the transducer to the pressure pin.

13. A method for attaching a transducer to a fastener to produce a load indicating member, using tooling including transducer placement tooling mounted above a self-centering vise for clamping the fastener in position during placement of the transducer on the fastener, wherein the method comprises the steps of:

placing the fastener in the self-centering vise with top end portions of the fastener prepared for receiving the transducer, so the axis of the fastener is aligned with a pressure pin associated with the transducer placement tooling, wherein the pressure pin has a pressure pin tip coupled with a pressure controlling spring and combined with a pressure pin rod which is free to move axially in an alignment bar;

placing the transducer on the top end portions of the fastener so that the transducer is positioned in the center of the fastener;

advancing the pressure pin so that the pressure pin tip rests on the fastener, controlling the amount of compression applied responsive to force of the pressure pin tip against the fastener;

raising the pressure pin, with the transducer adhered to the pressure pin tip by a low tack adhesive layer; placing a quantity of a transducer bonding adhesive in center portions of the top end portions of the fastener, forming a bonding surface; and lowering the pressure pin into contact with the center portions of the bonding surface, and locking the pressure pin in the lowered position while the transducer bonding adhesive cures.

14. The method of claim 13 which, following curing, further includes the step of raising the pressure pin to release the fastener and the attached transducer from the self-centering vise.

15. The method of claim 13 which further includes the step of limiting lowering of the alignment bar.

16. The method of claim 13 wherein the transducer bonding adhesive is a cyanoacrylate adhesive with a cure time of from 20 to 60 seconds, an anaerobic adhesive, or an epoxy adhesive.

\* \* \* \* \*